(12) United States Patent
Veitch (10) Patent No.: US 8,373,627 B1
(45) Date of Patent: Feb. 12, 2013

(54) LOW POWER OPTICAL INTERCONNECT DRIVER CIRCUIT

(75) Inventor: Randall C. Veitch, Nazareth, PA (US)

(73) Assignee: Wavefront Research, Inc., Bethlehem, PA (US)

( * ) Notice: Subject to any disclaimer, the term of this patent is extended or adjusted under 35 U.S.C. 154(b) by 2445 days.

(21) Appl. No.: 10/909,180

(22) Filed: Jul. 30, 2004

Related U.S. Application Data (60) Provisional application No. 60/491,496, filed on Jul. 31, 2003.

(51) Int. Cl.
*G09G 3/32* (2006.01)

(52) U.S. Cl. ......... 345/82; 345/102; 345/204; 345/212; 345/211

(58) Field of Classification Search ............... 315/185 S, 315/200 A, 200 R, 201–208, 209 R, 247, 315/312–326; 362/800–812; 345/78, 82, 345/102, 204, 211–214
See application file for complete search history.

(56) References Cited

U.S. PATENT DOCUMENTS

| | | | | |
|---|---|---|---|---|
| 3,648,073 A * | 3/1972 | Sams et al. | 327/111 |
| 3,869,641 A * | 3/1975 | Goldberg | 315/135 |
| 3,887,836 A * | 6/1975 | Leete | 315/207 |
| 3,906,162 A * | 9/1975 | Sparrevohn | 379/401 |
| 3,999,087 A * | 12/1976 | Compton | 324/107 |
| 4,129,791 A * | 12/1978 | Sato | 327/452 |
| 4,737,986 A * | 4/1988 | Tsunoda | 379/373.01 |
| 4,743,897 A | 5/1988 | Perez | 340/813 |
| 4,774,717 A * | 9/1988 | Takakusagi | 375/340 |
| 4,794,948 A * | 1/1989 | Schempp | 137/554 |
| 4,939,426 A * | 7/1990 | Menard et al. | 315/192 |
| 5,056,481 A * | 10/1991 | Podrapsky et al. | 123/149 D |
| 5,089,727 A * | 2/1992 | Molitor et al. | 327/181 |
| 5,418,807 A | 5/1995 | Chung | 372/38 |
| 5,442,258 A * | 8/1995 | Shibata | 315/129 |
| 5,895,984 A * | 4/1999 | Renz | 307/106 |
| 5,936,599 A * | 8/1999 | Reymond | 345/82 |
| 5,982,345 A * | 11/1999 | Takayama et al. | 345/76 |
| 6,169,491 B1 * | 1/2001 | McDonald | 340/815.4 |
| 6,359,392 B1 * | 3/2002 | He | 315/291 |
| 6,560,257 B1 | 5/2003 | DeSalvo et al. | 372/38.02 |
| 6,667,661 B1 | 12/2003 | Liu et al. | 330/311 |
| 6,748,180 B2 | 6/2004 | Feng | 398/182 |
| 7,025,473 B2 * | 4/2006 | Dokoupil | 362/640 |
| 7,280,375 B2 * | 10/2007 | Joos | 363/17 |
| 7,855,514 B2 * | 12/2010 | Ku et al. | 315/132 |
| 2003/0002551 A1 | 1/2003 | Kwon et al. | 372/38.02 |
| 2003/0043611 A1* | 3/2003 | Bockle et al. | 363/131 |
| 2006/0113930 A1* | 6/2006 | Andriolo | 318/66 |

FOREIGN PATENT DOCUMENTS
JP 08096394 10/1994

OTHER PUBLICATIONS

U.S. Appl. No. 60/491,496, filed Jul. 31, 2003 entitled "Low Power Optical Interconnect Driver Circuit" for Randall C. Veitch.

* cited by examiner

*Primary Examiner* — Tuyet Thi Vo
(74) *Attorney, Agent, or Firm* — Burns & Levinson LLP; Jacob N. Erlich; Orlando Lopez (57) ABSTRACT

A driver circuit for driving a light emitting semiconductor device. The driver circuit of this invention includes a capacitor connected between a source of voltage pulses and a light emitting semiconductor device.

20 Claims, 8 Drawing Sheets

LOW POWER OPTICAL INTERCONNECT DRIVER CIRCUIT

CROSS REFERENCE TO RELATED APPLICATIONS

This application claims priority of U.S. Provisional Application 60/491,496 filed on Jul. 31, 2003, which is incorporated by reference herein.

STATEMENT OF GOVERNMENT INTEREST

This invention was partially made with U.S. Government support from the U.S. Navy under contracts #N00178-03-C-1024 and #N00178-04-C-1034. The U.S. Government has certain rights in the invention.

BACKGROUND OF THE INVENTION

This invention relates generally to optical interconnect driver circuits, and, more particularly to systems and methods for driving a light emitting semiconductor device.

In optical interconnect systems, when the interconnect channel density becomes many hundreds of interconnects and even greater per square inch, the thermal gradients and thermal dissipation in the interconnect elements themselves become a major issue. This undesirable trait costs the system even more energy to extract this thermal load from the interconnect component area, particularly when active cooling devices such as thermo-electric (Peltier) coolers are required.

The use of VCSELs for optical data links is well established in the art. The laser elements in these links are driven by a multitude of electronic devices at various power levels, data rates and duty cycles. Typically, these VCSEL systems are designed to switch or modulate within a linear region of lasing operation. This is accomplished by electrically biasing the laser element above the lasing threshold and into its linear mode of operation. For fastest modulation capability, e.g., in the multi-gigaHertz regime, the VCSELs are biased above the lasing threshold to take advantage of the fast stimulated-emission based response times.

The main contributors of power dissipation in a typical (biased) VCSEL based system are the constant current bias through the VCSEL, the magnitude of the signal current applied to the VCSEL element and the energy required for the supporting driving circuits.

Further, in optical interconnects, manufacture and alignment techniques may require accurate positioning of the interconnect components. This active positioning can be facilitated by active alignment techniques.

Lower power dissipation is almost always desirable. The need for lower power dissipation is even further accentuated in cryogenic application (such as, intra-Dewar environments). In a Dewar environment, traditional optical data links become prohibitive due to the undesired thermal load contributions to the cold side of the Dewar system.

Based on the above, there is a need to provide a circuit for driving a VCSEL based optical link while dissipating very low levels of thermal energy.

There is also a need to provide a low power driver circuit suitable for high density optical interconnects and thermally sensitive applications such as in cryogenic Dewars.

Furthermore, there is a need to provide a low power circuit and optical interconnect modulation scheme for driving Light Emitting Diode (LED) based optical interconnects.

There is also a need to provide a low power circuit and optical interconnect modulation scheme.

There is also a need to provide a low power circuit that provides for active alignment.

There is also a need to provide a low power electronic driver circuit and optical emitter.

SUMMARY OF THE INVENTION

The needs set forth above as well as further and other needs and advantages of the present invention are achieved by the embodiments of the invention described herein below.

A driver circuit for a light emitting semiconductor device is disclosed.

In one embodiment, the present invention is in the form of a driver circuit made up of an RC differentiator circuit. In that embodiment, the RC circuit differentiates a conventional digital waveform, providing short duration current pulses to a light emitting semiconductor device, such as, but not limited to, a VCSEL or other light emitter, or, more generally, to an electrical wire or waveguide, thereby emitting pulses which act to transfer the data or signal. In one embodiment, the driver circuit of this invention includes a capacitor connected between a source of voltage pulses and a terminal of the light emitting semiconductor device, and, a diode connected in parallel to the light emitting semiconductor device. The diode is located such that a direction of forward current flow of the diode being opposite to a forward current flow direction of the light emitting semiconductor device.

While the embodiments disclosed below are for the case of a VCSEL, the present invention is readily applied to other optical emitters such as, but not limited to, LEDs, to other light emitting semiconductor junction device and also to reducing the power transmitted down wires and electrical waveguides. In one embodiment of the invention the shape of the current pulse through the light emitting semiconductor device is determined by the resistivity of the light emitting semiconductor device and a capacitor forming an electrical RC differentiator circuit.

In one embodiment of the circuit of this invention, the light emitting semiconductor device is driven from a completely OFF condition (no bias used), through the non-linear region of operation to a point above the lasing threshold, but still providing a predictable photonic output. During circuit operation the only power dissipated is during the interval when the capacitor charges or discharges; there is substantially no DC current component (except for leakage currents and the like). The current through the light emitting semiconductor device is both time dependent and intermittent. The charging or discharging is a dynamic one-time event, regardless of the resting state of the input logic signal. Moreover, in many embodiments substantially low capacitance values can be used, which results in a low load burden on the driving input signal.

The driver circuit of the present invention can reduce the power dissipation substantially by using a pulsed driver scheme that passively reduces the duty cycle of the data stream.

In embodiments of the driver circuit of this invention, a light emitting semiconductor device (a VCSEL in one embodiment) can be modulated ON/OFF in a controlled, pulsed duty cycle without the burden of the extra power requirement normally associated with the circuit elements controlling pulse width and bias requirements. This can allow for a comparatively low, overall power dissipation in an optical interconnect system.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENTS

A driver circuit for a light emitting semiconductor device is disclosed hereinbelow.

Figure 1:
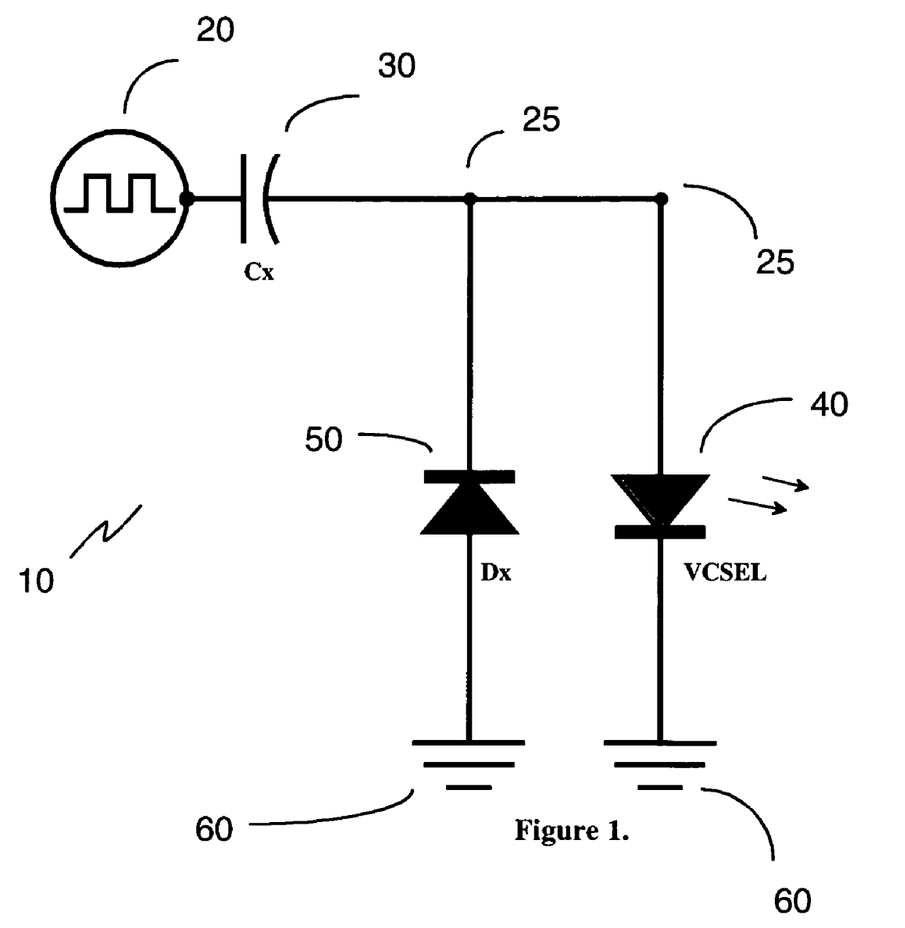
FIG. 1 is a schematic description of an embodiment of the electrical driver circuit of this invention.

An embodiment 10 of the driver circuit of this invention for driving a light emitting semiconductor device (a VCSEL in the embodiment shown) is shown in FIG. 1.

Referring to FIG. 1, the embodiment 10 of the driver circuit of this invention includes a capacitor 30 connected between a source of voltage pulses 20 and a terminal 25 of the light emitting semiconductor device 40 (a VCSEL 40 in the embodiment shown), the light emitting semiconductor device 40 being connected so that a forward current flow direction of the light emitting semiconductor device (indicated by the pointed portion of the symbol used to represent the light emitting semiconductor device 40) is away from the terminal 25, and, a diode 50 connected in parallel to the light emitting semiconductor device 40. The diode 50 is connected so that a direction of forward current flow of the diode 50 is opposite to the forward current flow direction of the light emitting semiconductor device 40. In the embodiment shown, the diode 50 and the light emitting semiconductor device 40 are both connected to ground 60. It should be noted that an embodiment in which the light emitting semiconductor device 40 is connected so that a forward current flow direction of the light emitting semiconductor device 40 is toward the terminal 25 is also within the scope of this invention.

"Voltage pulses" (also referred as input signals or input voltage signals) as used herein refers to time dependent voltage signals such as, but not limited, digital signals, sinusoidal signals or other time varying voltage signals.

The embodiment 10 of the driver circuit of this invention is a RC differentiator circuit comprised of the capacitor 30 (Cx) and the internal resistive component of the light emitting semiconductor device 40 (VCSEL). (The light emitting semiconductor device 40 has an internal resistive component and represents the resistance in the charge leg of the RC circuit.) The RC circuit path allows for a charge current of limited time duration and magnitude to pass through the light emitting semiconductor device 40. The diode 50 (Dx, also referred to as a protective device) provides a circuit path for the discharge current of the capacitor 30 (Cx) and also functions to protect the light emitting semiconductor device 40 from any possible damaging reverse voltage transient.

Figure 2:
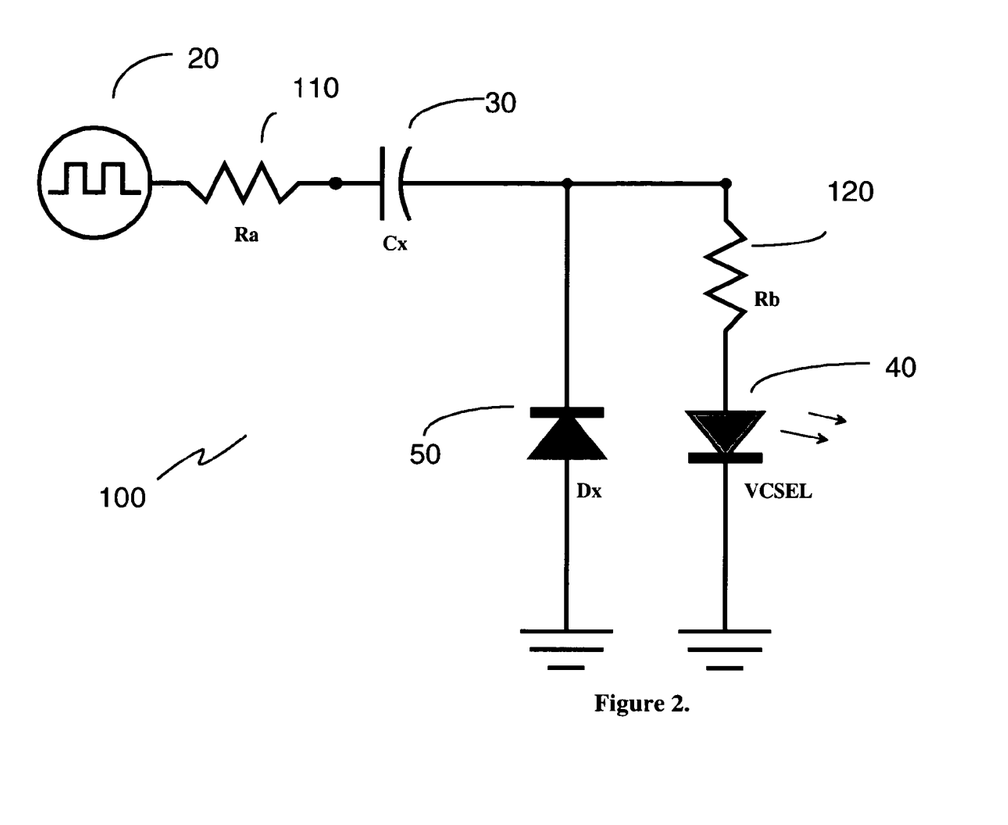
FIG. 2 is a schematic description of another embodiment of the electrical driver circuit of this invention.

The embodiment 100 of the driver circuit of this invention, shown in FIG. 2, includes a resistor 110 connected in series with the capacitor 30 (Cx) and/or another resistor 120 connected in series with the light emitting semiconductor device 40, the diode 50 being connected in parallel with the series combination of other resistor 120 and the light emitting semiconductor device 40. Circuit functionality is unchanged but this embodiment can allow for additional tailoring of duration and magnitude of the pulse currents. In certain applications it may be desirable to tailor capacitor charge rates to allow a greater range of capacitor values and limit current/voltage rise rates (thereby altering the pulse shape of the optical emission).

Figure 3:
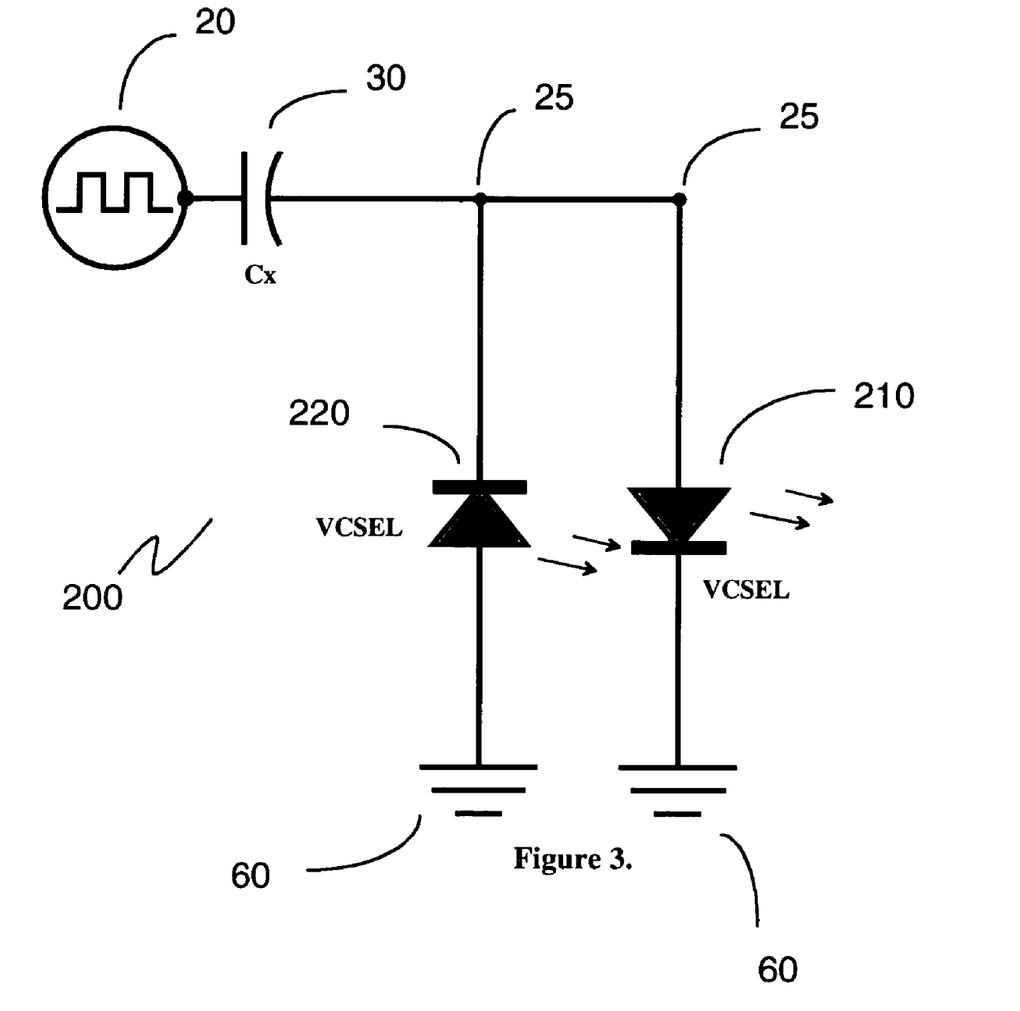
FIG. 3 represents a schematic description of an embodiment of the electrical driver circuit of this invention including two light emitting semiconductor devices.

The embodiment 200 of the driver circuit of this invention shown in FIG. 3 includes two light emitting semiconductor devices 210, 220 (VCSEL devices in the embodiment shown) wired in parallel and having opposite polarities (also referred to as one light emitting semiconductor device 210 and the other light emitting semiconductor device 220 are located, positioned or oriented such that a direction of forward current flow of the one light emitting semiconductor device 210 is opposite to the forward current flow direction of the other light emitting semiconductor device 220) allowing one semiconductor device to emit radiation at the rising edge of the input signal and the other to emit radiation at the falling edge of the input signal. The capacitor 30 charges through one light emitting semiconductor device (VCSEL) 210 and discharges through the second light emitting semiconductor device (VCSEL) 220. In this embodiment, the second light emitting semiconductor device (VCSEL) 220 replaces the diode 50 in FIG. 1. This mode of operation can be used to provide an error check or error reduction in data integrity using a differential optical channel scheme. This embodiment can potentially enable lower optical power levels and overall lower power dissipation, using techniques such as synchronous detection or temporal filtering. Primary circuit functionality and benefits are substantially unchanged.

Figure 4:
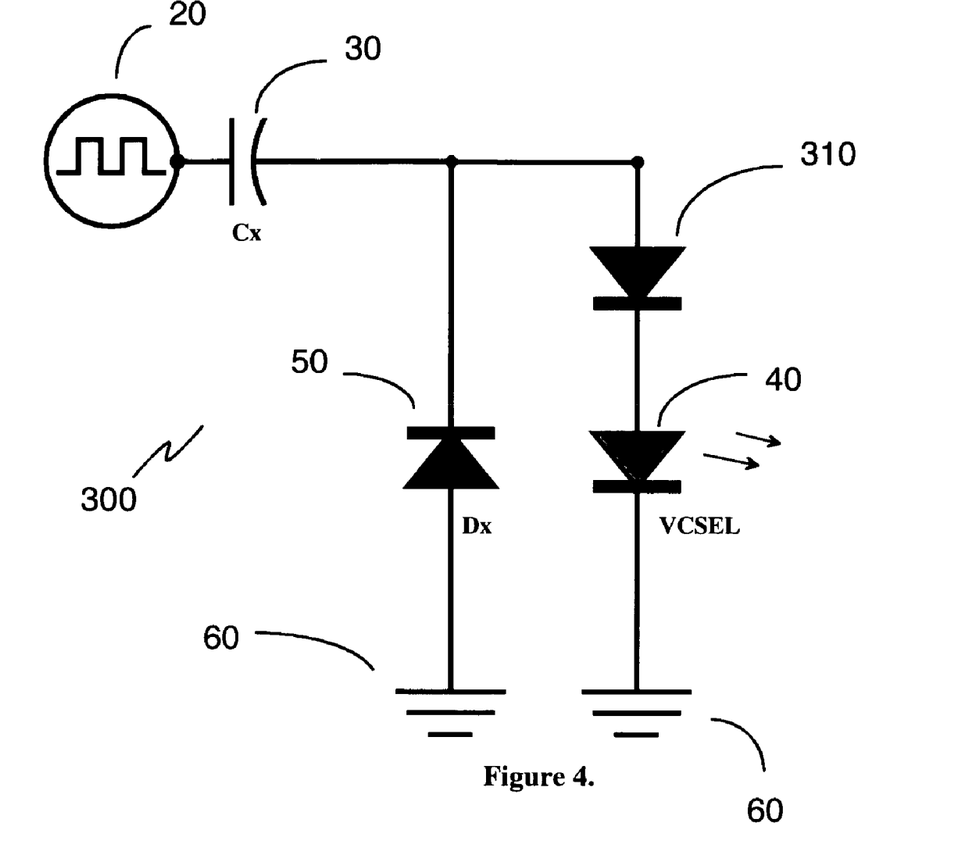
FIG. 4 is a schematic description of yet another embodiment of the electrical driver circuit of this invention.

The embodiment 300 of the driver circuit of this invention shown in FIG. 4 includes another diode 310 connected in series with the light emitting semiconductor device 40. In one embodiment, the other diode 310 may enhance reverse recovery characteristics of the light emitting semiconductor device 40 (VCSEL) current path. If the light emitting semiconductor device 40 (VCSEL device) has a poor reverse recovery characteristic (for example, but not limited to, slow response to a reverse bias) the light emitting semiconductor device 40 (VCSEL) will be conducting for a time interval when switching from a forward biased mode to a reversed bias mode. For example, the additional diode can be selected for an improved reverse recovery characteristic, thus decreasing or limiting the reverse bias on-time current in the VCSEL branch of the circuit, therefore, decreasing the amount of overall thermal energy dissipated by the VCSEL. Primary circuit functionality is substantially unchanged.

Figure 5:
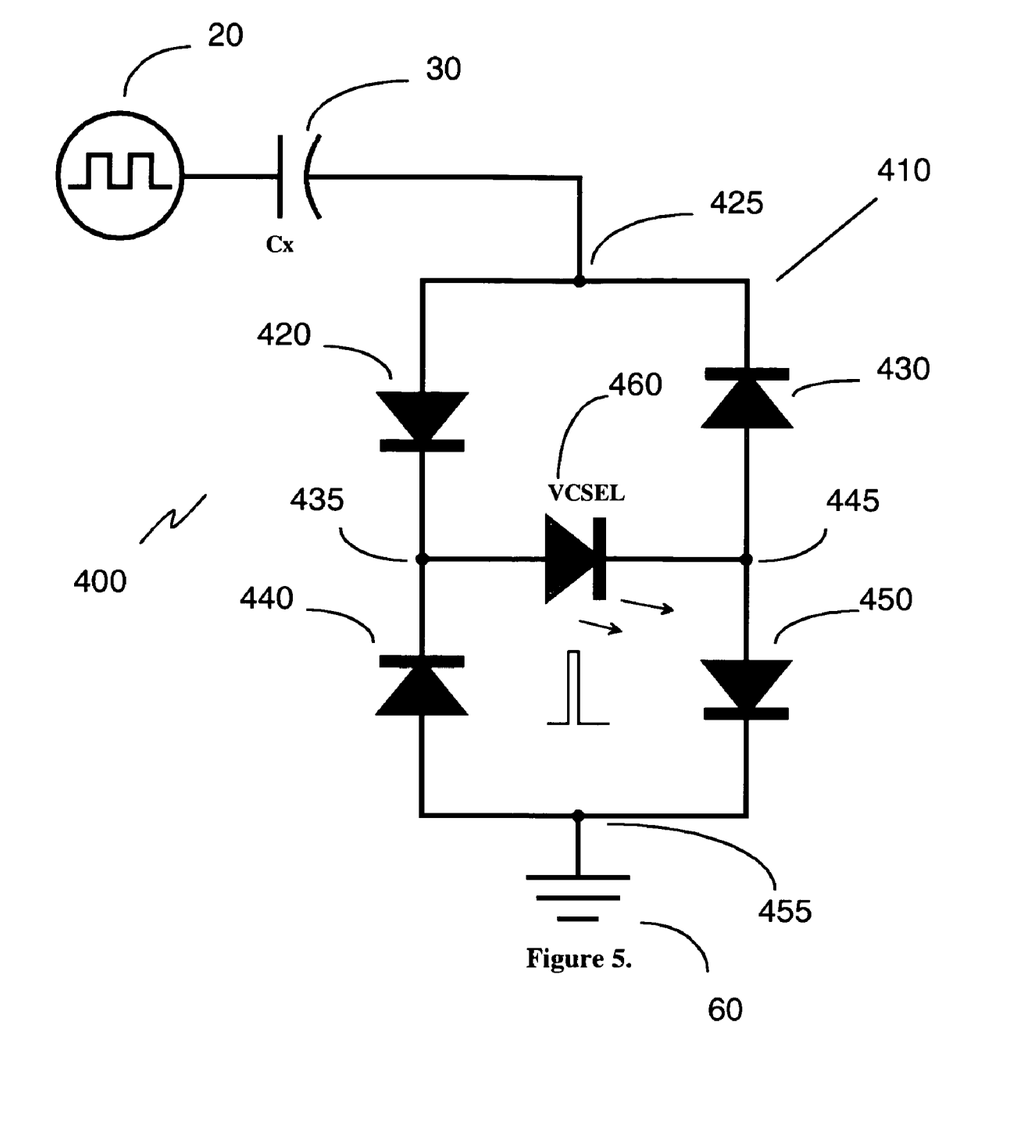
FIG. 5 is a schematic description of a further embodiment of the electrical driver circuit of this invention.

The embodiment 400 of the driver circuit of this invention shown in FIG. 5 includes a full wave bridge rectifier 410. The full wave bridge rectifier 410 includes four diodes 420, 430, 440, 450 and four terminals 425, 435, 445, 455. A first diode 420 and a second diode 430 are connected to an upper terminal 425. The first diode 420 is connected between the upper terminal 425 and one center terminal 435 and the second diode 430 is connected between the upper terminal 425 and another center terminal 445. The first 420 and second 430 diodes are connected such that the first 420 and second 430 diodes have opposite directions of forward current flow, as shown in FIG. 5. A third diode 440 is connected between one center terminal 435 and a lower terminal 455. A fourth diode 450 is connected between the other center terminal 445 and the lower terminal 455. The third diode 440 and the first diode 420 are connected such the third diode 440 and the first diode 420 have opposite directions of forward current flow. The fourth diode 450 and the second diode 430 are connected such that the fourth diode 450 and the second diode 430 have opposite directions of forward current flow. The light emitting semiconductor device 460 is connected between one center terminal 435 and the other center terminal 445. The light emitting semiconductor device (VCSEL in the embodiment shown) 460 is connected so that the forward current flow direction of the light emitting semiconductor device 460 enables current flow for any direction of current flow between the upper terminal 425 and lower terminal 455. This embodiment allows a single light emitting semiconductor device 460 to emit radiation at either input signal 20 transition edge. The rectifier bridge 410 steers both the capacitor 30 charge (the capacitor 30 is connected between the source 20 of voltage pulses and the upper terminal 425) and discharge currents through the light emitting semiconductor device 460 (VCSEL) and can provide dual edge emission for a single data pulse. Such an effect can allow, for example, using techniques such as synchronous detection or temporal filtering to minimize data bit error rates in an optical interconnect link.

It should be noted that, as in FIG. 2, in the embodiment shown in FIG. 5, a resistor can be connected in series with the capacitor 30. Such an embodiment can allow for additional tailoring of duration and magnitude of the pulse currents.

Figure 6:
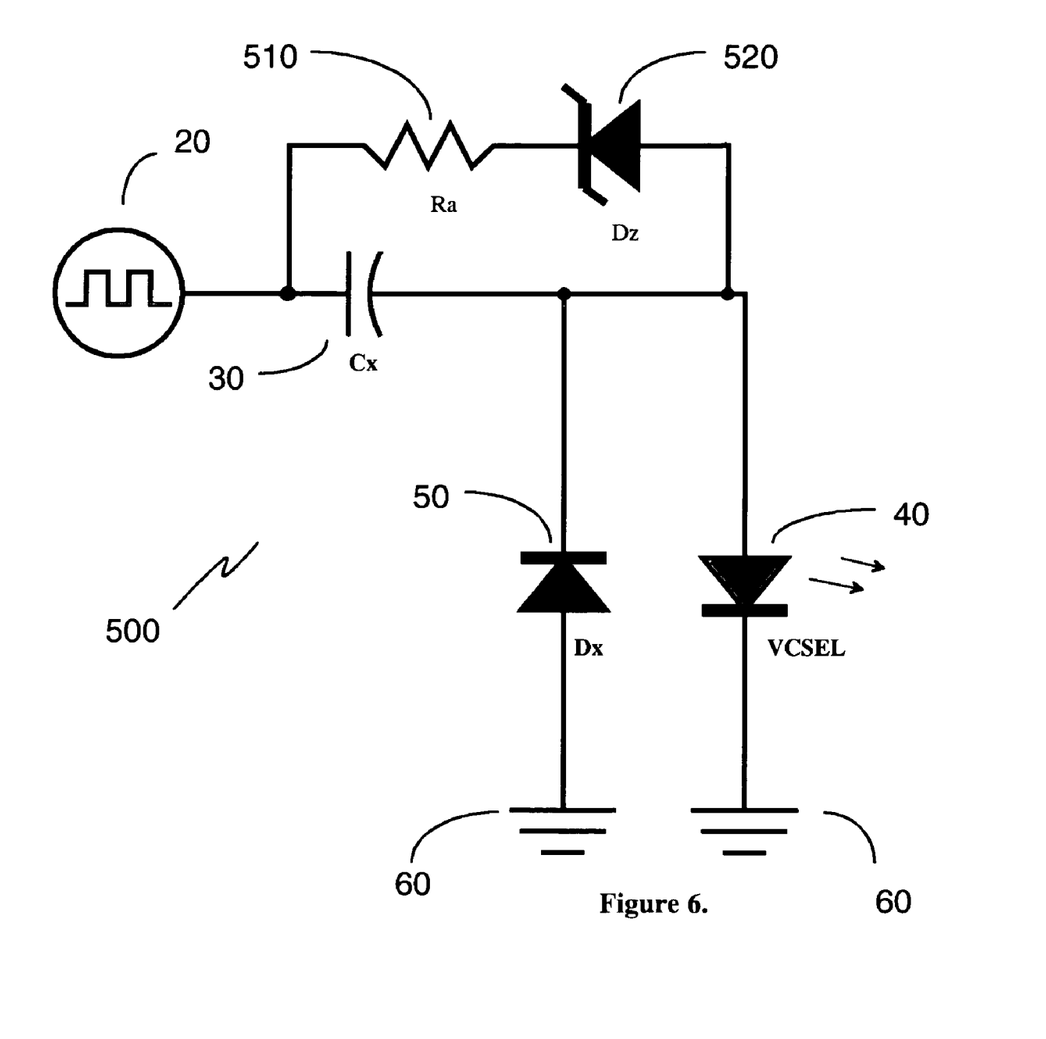
FIG. 6 is a schematic description of yet a further embodiment of the electrical driver circuit of this invention.

The embodiment 500 of the driver circuit of this invention shown in FIG. 6 includes a series combination of a resistor 510 connected in series with a Zener diode 520, the series combination being connected in parallel with the capacitor 30. The Zener diode 520 is connected so that a voltage across the capacitor 30 reverse biases the Zener diode. This embodiment can allow for selective operation of the light emitting semiconductor device 40 (VCSEL) in a DC mode by allowing the input signal 20 amplitude to exceed the turn-on threshold of the Zener diode (Dz) 520. This can facilitate alignment, calibration, and testing of the light emitting semiconductor device 40 (VCSEL) and also can allow for the light emitting semiconductor device 40 (VCSEL) to be pulsed directly, substantially bypassing the capacitor 30. When the input voltage signal remains below the Zener diode voltage threshold the circuit again reverts to functioning as an RC differentiator.

Figure 7:
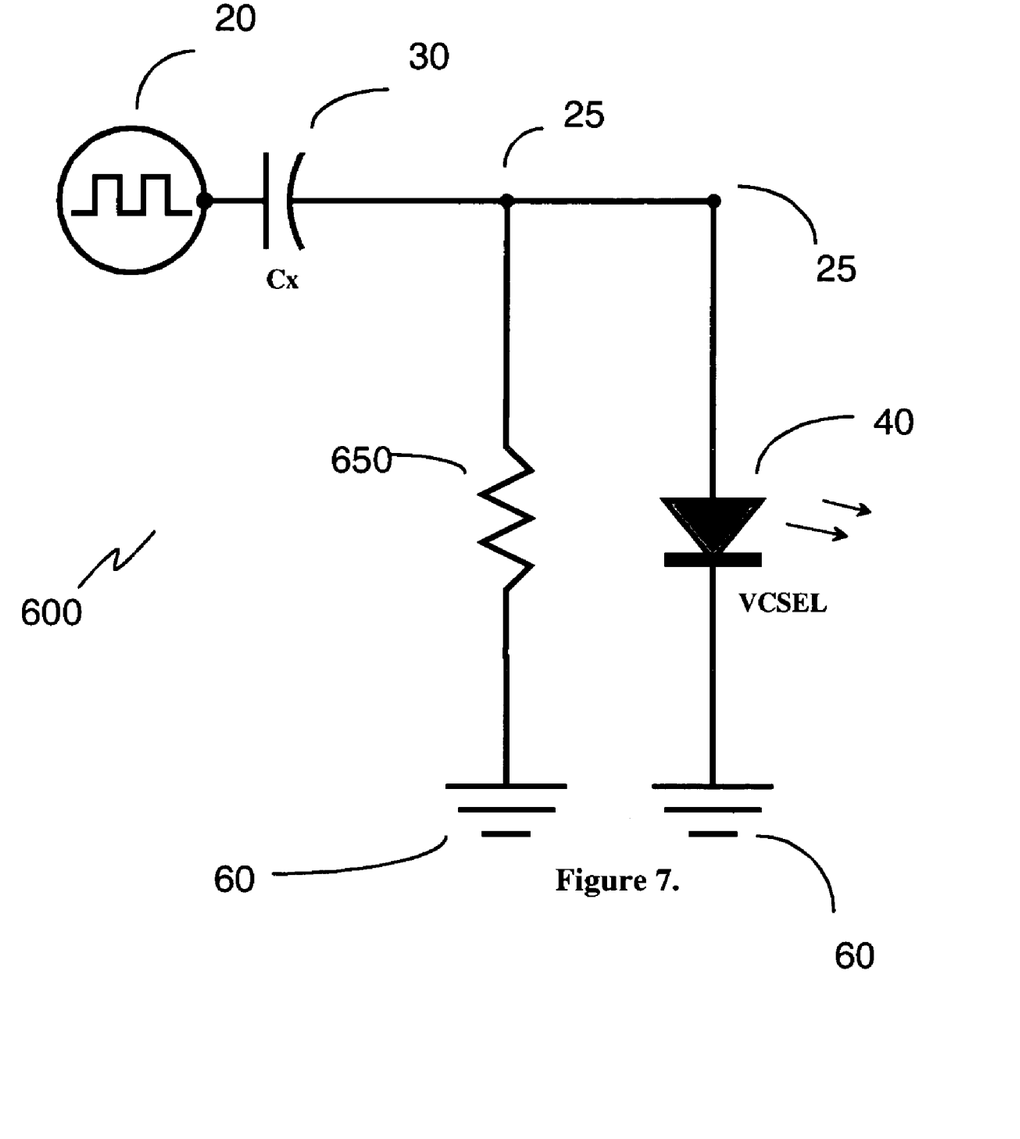
FIG. 7 is a schematic description of yet another further embodiment of the electrical driver circuit of this invention.
Figure 8:
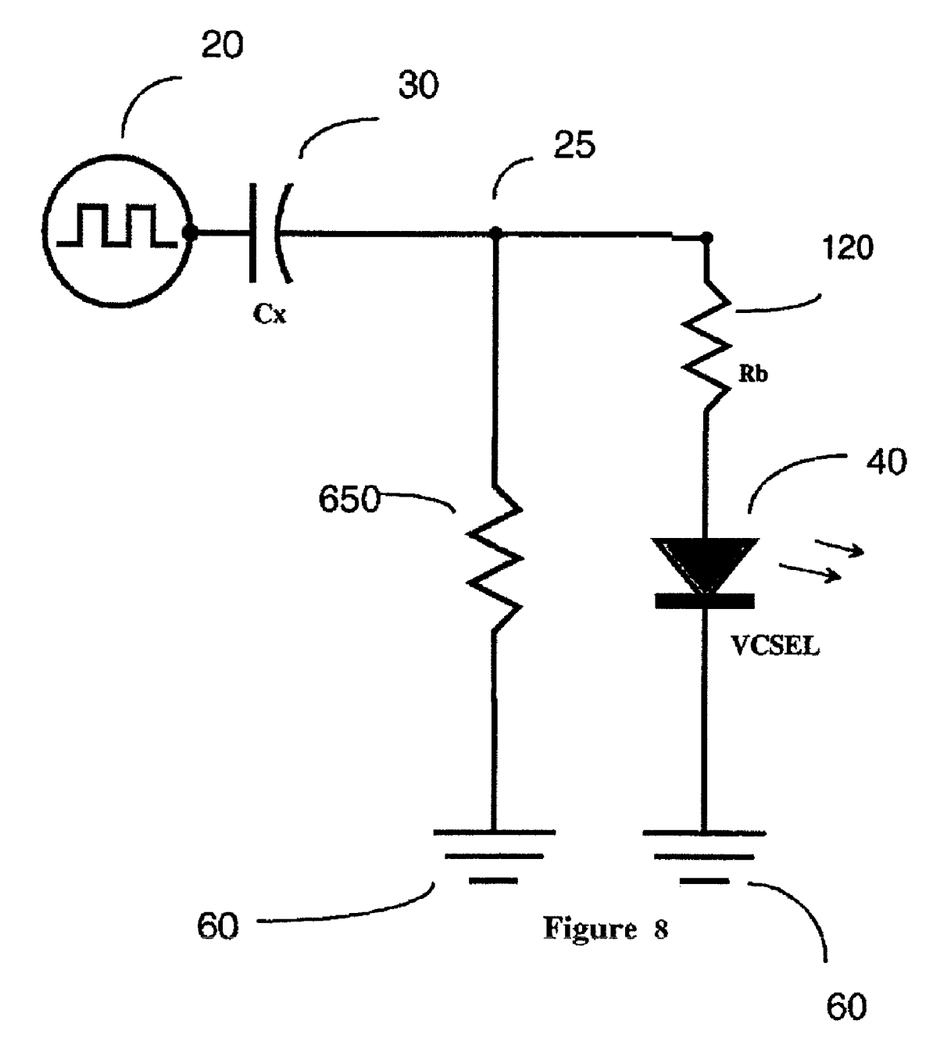
FIG. 8 is a schematic description of still another further embodiment of the electrical driver circuit of this invention.

Referring to FIG. 7, the embodiment 600 of the driver circuit of this invention includes a capacitor 30 connected between a source of voltage pulses 20 and a terminal 25 of the light emitting semiconductor device 40 (a VCSEL 40 in the embodiment shown), the light emitting semiconductor device 40 being connected so that a forward current flow direction (also referred to as a preferred direction) of the light emitting semiconductor device (indicated by the pointed portion of the symbol used to represent the light emitting semiconductor device 40) is away from the terminal 25, and, a resistor 650 connected in parallel to the light emitting semiconductor device 40. It should be noted that embodiments in which another resistor is connected in series with the capacitor 30 or/and another resistor is connected in series with the light emitting semiconductor device 40 (placing the series combination in parallel with the first resistor) are also within the scope of this invention.

In the embodiments presented herein above, the charge in the capacitor 30 is changed by charging or discharging through an RC circuit. A path for the flow of current is provided through the light emitting semiconductor device 40, either preferentially in one of the two directions of current flow produced by the change in the charge in the capacitor (as in FIG. 1, where the forward direction of current flow through the light emitting semiconductor device corresponds to charging the capacitor for one embodiment of voltage polarity) or for both directions of current flow produced by the change in the charge in the capacitor (as in FIG. 5).

In the embodiments shown in FIGS. 1 through 5 above, connecting the RC differentiator circuit comprised of the capacitor 30 and a resistance to the source 20 of voltage pulses provides means for changing charge in the capacitor 30. (In FIG. 1, the resistance is the internal resistive component of the light emitting semiconductor device 40 in parallel with the internal resistive component of the diode 50. In FIG. 2, the resistance is provided by resistors 110 in series with the parallel combination of the series combination, resistor 120 in series with the internal resistive component of the light emitting semiconductor device 40, and the internal resistive component of the diode 50. In FIG. 3, the resistance is provided by the internal resistive component of the light emitting semiconductor device 210 in parallel with the internal resistive component of the other light emitting semiconductor device 220. In FIG. 4, the resistance is provided by the parallel combination of the internal resistive component of the other diode 310 in series with the internal resistive component of the light emitting semiconductor device 40 and the internal resistive component of the diode 50. In FIG. 5, the resistance is provided by the combined resistance of the internal resistive component of the diodes 410, 420, 430, 440 and the internal resistive component of the light emitting semiconductor device 450.) Means for providing a path for flow of current through the light emitting semiconductor device are provided by the connecting the light emitting semiconductor device (including the internal resistive component of the light emitting semiconductor device) to the capacitor as shown in FIGS. 1-5.

Although various embodiments of this invention that include series resistors have been shown above, it should be noted that other embodiments including resistors in series with the capacitor, the light emitting semiconductor device, the protective devices (including those in the full wave rectifier), or the Zener diode are within the scope of this invention. A resistor in series with any component will not alter the primary circuit functionality and, therefore, the embodiment would be within the scope of this invention.

It should be noted that although in the embodiments of FIGS. 1-4, 6 and 7, a forward direction of current flow of the light emitting semiconductor device is shown, embodiments are possible in which the forward direction of current flow of the light emitting semiconductor device is opposite that shown.

Although the invention has been described with respect to various embodiments, it should be realized this invention is also capable of a wide variety of further and other embodiments within the spirit and scope of the appended claims.

What is claimed is:

1. A driver circuit comprising:
   a capacitor connected in series with a source of voltage pulses and between the source of voltage pulses and a light emitting semiconductor device; the capacitor being charged by voltage pulses from said source of voltage pulses,
   a diode connected in parallel to the light emitting semiconductor device, said diode being located such that a direction of forward current flow of said diode is opposite to a forward current flow direction of the light emitting semiconductor device; the capacitor and the light emitting semiconductor device configured such that the capacitor is charged through the RC circuit including the capacitor and at least one of an internal resistive component of the light emitting semiconductor device or an internal resistive component of a diode connected in parallel to the light emitting semiconductor device.

2. The driver circuit of claim 1 further comprising:
a resistor connected in series with the light emitting semiconductor device, the diode being connected in parallel with the resistor and the light emitting semiconductor device.

3. The driver circuit of claim 1 wherein the diode comprises another light emitting semiconductor device.

4. The driver circuit of claim 1 further comprising:
another diode connected in series with the light emitting semiconductor device, the diode being connected in parallel with said another diode and the light emitting semiconductor device, said another diode being located such that a direction of forward current flow of said another diode is in a same direction as the forward current flow direction of the light emitting semiconductor device.

5. The driver circuit of claim 1 wherein the forward current flow direction of the light emitting semiconductor device corresponds to a direction of capacitor charging current.

6. The driver circuit of claim 1 further comprising:
a resistor connected in series with the capacitor.

7. The driver circuit of claim 6 further comprising:
another resistor connected in series with the light emitting semiconductor device, the diode being connected in parallel with said another resistor and the light emitting semiconductor device.

8. A driver circuit comprising:
a capacitor connected between a source of voltage pulses and a light emitting semiconductor device;
a diode connected in parallel to the light emitting semiconductor device, said diode being located such that a direction of forward current flow of said diode is opposite to a forward current flow direction of the light emitting semiconductor device; and
a series combination of a resistor connected in series with a Zener diode, the series combination being connected in parallel with the capacitor, said Zener diode being located such that said Zener diode has a direction of forward current flow opposite to the forward current flow direction of the light emitting semiconductor device.

9. A driver circuit comprising:
a full wave bridge rectifier comprising a first, second, third and fourth diode and a first, second, third and fourth terminal, said first diode and said second diode being connected to said first terminal, said first diode being connected between said first terminal and said second terminal and said second diode being connected between said first terminal and said third terminal, said first and second diodes being connected such that said first and second diodes have opposite directions of forward current flow with respect to said first terminal, said third diode being connected between said second terminal and said fourth terminal, said fourth diode being connected between said third terminal and said fourth terminal, said third diode and said first diode being connected such that said third diode and said first diode have opposite directions of forward current flow, said fourth diode and said second diode being connected such that said fourth diode and said second diode have opposite directions of forward current flow; and a capacitor connected in series with a source of voltage pulses between the source of voltage pulses and said first terminal of the full wave bridge rectifier; charge in the capacitor being changed by the series connection with the source of voltage pulses; the capacitor and the light emitting semiconductor device configured such that the capacitor is charged through the RC circuit including the capacitor and at least one of an internal resistive component of the light emitting semiconductor device or an internal resistive component of a diode connected in parallel to the light emitting semiconductor device; current produced by a change in the charge in the capacitor flowing through the light emitting semiconductor device;
whereby the driver circuit is capable of driving a light emitting, semiconductor device connected between said second terminal and said third terminal, the light emitting semiconductor device being connected so that the forward current flow direction of the light emitting semiconductor device enables current flow for any direction of current flow between said first terminal and said fourth terminal.

10. The driver circuit of claim 9 further comprising:
a resistor connected in series with the capacitor.

11. A method for driving a light emitting semiconductor device, the method comprising the steps of:
changing charge in a capacitor by connecting the capacitor in series with a source of voltage pulses; the capacitor being charged through the RC circuit including the capacitor and at least one of an internal resistive component of the light emitting semiconductor device or an internal resistive component of a diode connected in parallel to the light emitting semiconductor device; and
providing a path for flow of current through the light emitting semiconductor device;
wherein the current is produced by the change in the charge in the capacitor; and,
whereby the light emitting semiconductor device is driven by the current flow.

12. The method of claim 11 wherein the step of providing a path for flow of current through the light emitting semiconductor device comprises:
connecting a first terminal of a full wave bridge rectifier circuit to the capacitor; and,
connecting the light emitting semiconductor device between a second and a third terminal of the full wave bridge rectifier circuit, the light emitting semiconductor device being connected so that a forward current flow direction of the light emitting semiconductor device enables current flow for any direction of current flow between the first terminal and a fourth terminal of the full wave bridge rectifier circuit.

13. The method of claim 11 further comprising the step of;
providing an alternate path for path for flow of current through a protective device, the protective device having a forward direction of current flow corresponding to one direction of current flow produced by the change in the charge in the capacitor; and
wherein a forward direction of current flow of the light emitting semiconductor device corresponds to another direction of current flow produced by the change in the charge in the capacitor.

14. A driver circuit comprising:
means for changing charge in a capacitor; said means for changing charge comprising connecting the capacitor in series with a source of voltage pulses; the capacitor and the light emitting semiconductor device configured such that the capacitor is charged through the RC circuit including the capacitor and at least one of an internal resistive component of the light emitting semiconductor device or an internal resistive component of a diode connected in parallel to the light emitting semiconductor device; and means for providing a path for flow of current through a light emitting semiconductor device;

wherein the current is produced by the change in the charge in the capacitor; and, whereby the light emitting semiconductor device is driven by the current flow.

15. The driver circuit of claim 14 wherein the means for providing a path for flow of current comprise:

a full wave bridge rectifier comprising a first, second, third and fourth diode and a first, second, third and fourth terminal, said first diode and said second diode being connected to said first terminal, said first diode being connected between said first terminal and said second terminal and said second diode being connected between said first terminal and said third terminal, said first and second diodes having opposite directions of forward current flow, said third diode being connected between said second terminal and said fourth terminal, said fourth diode being connected between said third terminal and said fourth terminal, said third diode and said first diode being connected such that said third diode and said first diode have opposite directions of forward current flow, said fourth diode and said second diode being connected such that said fourth diode and said second diode have opposite directions of forward current flow;

wherein the capacitor is connected to the first terminal of the full wave bridge rectifier; and, whereby the driver circuit is capable of driving a light emitting semiconductor device connected between said second terminal and said third terminal, the light emitting semiconductor device being connected so that the forward current flow direction of the light emitting semiconductor device enables current flow for any direction of current flow between said first terminal and said fourth terminal.

16. The driver circuit of claim 14 further comprising:

means for providing an alternate path for path for flow of current through a protective device, the protective device having a forward direction of current flow corresponding to one direction of current flow produced by the change in the charge in the capacitor; and wherein a forward direction of current flow of the light emitting semiconductor device corresponds to another direction of current flow produced by the change in the charge in the capacitor.

17. The driver circuit of claim 16 wherein the protective device is another light emitting semiconductor device.

18. A driver circuit comprising:

a capacitor connected in series with a source of voltage pulses and between the source of voltage pulses and a light emitting semiconductor device; and a resistor connected in parallel to the light emitting semiconductor device; the capacitor and the light emitting semiconductor device configured such that the capacitor is charged through the RC circuit including the capacitor and at least one of an internal resistive component of the light emitting semiconductor device or an internal resistive component of a diode connected in parallel to the light emitting semiconductor device.

19. The driver circuit of claim 18 further comprising:

another resistor connected in series with the capacitor.

20. The driver circuit of claim 18 further comprising:

another resistor connected in series with the light emitting semiconductor device, said resistor being connected in parallel with said another resistor and said light emitting semiconductor device.

\* \* \* \* \*

UNITED STATES PATENT AND TRADEMARK OFFICE
CERTIFICATE OF CORRECTION

| | | |
|---|---|---|
| PATENT NO. | : 8,373,627 B1 | Page 1 of 1 |
| APPLICATION NO. | : 10/909180 | |
| DATED | : February 12, 2013 | |
| INVENTOR(S) | : Randall C. Veitch | |

It is certified that error appears in the above-identified patent and that said Letters Patent is hereby corrected as shown below:

In Column 8, line 16 (claim 9), "emitting, semiconductor" should read -- emitting semiconductor --
    In Column 8, line 53 (claim 13), "the step of;" should read -- the step of: --

Signed and Sealed this
Ninth Day of April, 2013

Teresa Stanek Rea
*Acting Director of the United States Patent and Trademark Office*